United States Patent
Lemmen

[11] Patent Number: 5,513,897
[45] Date of Patent: May 7, 1996

[54] VEHICLE SEAT

[76] Inventor: Roger D. Lemmen, 1241 Heather Dr., Holland, Mich. 49423

[21] Appl. No.: 199,501

[22] Filed: Feb. 22, 1994

[51] Int. Cl.⁶ .................................................. B60N 2/48
[52] U.S. Cl. .......................... 297/410; 297/391; 296/68.1
[58] Field of Search ................... 297/284.1, 353, 297/391, 396, 410, 464, 63; 296/68.1

[56] References Cited

U.S. PATENT DOCUMENTS

| | | | |
|---|---|---|---|
| 662,387 | 11/1900 | Baker | 297/391 |
| 2,680,476 | 6/1954 | Saffell . | |
| 3,101,973 | 8/1963 | Toth | 297/391 |
| 3,172,702 | 3/1965 | Rose . | |
| 3,178,225 | 4/1965 | Bayer . | |
| 3,279,850 | 10/1966 | Saemann et al. | 277/353 |
| 3,802,737 | 4/1974 | Mertens . | |
| 3,832,002 | 8/1974 | Eggert, Jr. et al. . | |
| 3,865,450 | 2/1975 | Bruenig . | |
| 4,015,878 | 4/1977 | Perkins | 297/353 |
| 4,033,622 | 7/1977 | Boudreau . | |
| 4,114,948 | 9/1978 | Perkey . | |
| 4,130,318 | 12/1978 | Hemmen et al. . | |
| 4,190,289 | 2/1980 | Bunig et al. | 297/391 |
| 4,402,548 | 9/1983 | Mason . | |
| 4,440,443 | 4/1984 | Nordskog . | |
| 4,655,503 | 4/1987 | Kamijo et al. . | |
| 4,679,854 | 7/1987 | Putsch et al. . | |
| 4,736,911 | 4/1988 | Heitmann . | |
| 4,787,676 | 11/1988 | Nevide Mevegnies | 297/353 |
| 4,874,203 | 10/1989 | Henley . | |
| 4,899,961 | 2/1990 | Herndon . | |
| 4,971,393 | 11/1990 | Maisenhalder . | |
| 5,123,673 | 6/1992 | Tame . | |
| 5,290,091 | 3/1994 | Dellano et al. | 297/391 |

FOREIGN PATENT DOCUMENTS 2429457  1/1976  Germany ............................ 297/487

Primary Examiner—Peter R. Brown
Attorney, Agent, or Firm—Price, Heneveld, Cooper, DeWitt & Litton

[57] ABSTRACT

A vehicle seat assembly includes an adjustable column supporting a seat portion and a back. The back includes an upper portion vertically adjustable with respect to the seat portion. A headrest restraint system is positioned on the back upper portion. The headrest restraint system includes a position indicator configured to engage the nape of the neck of the user and side or lateral support portions. A mesh support extends from the headrest, and a mesh is connected between the upper back portion and the mesh support. A seat belt restraint system includes inboard and outboard shoulder belts and a lap belt anchored to the seat. The shoulder belts are anchored to the sides of the back and positioned to extend around the deltoid region of the shoulders of the user.

17 Claims, 2 Drawing Sheets

VEHICLE SEAT

BACKGROUND OF THE INVENTION

The present invention relates to vehicle seats and, more particularly, to a vehicle seat which includes an occupant restraint system.

Various forms of vehicle seats are presently available. The typical automotive seat includes an adjustable headrest and a seat belt restraint system. The headrest is vertically adjustable and may be positioned to engage the head of the user in a rear-impact situation. Protection may not be obtained if the headrest is not properly positioned. Typical seat belt systems include a shoulder belt and a lap belt. Such three-point systems provide some lateral restraint during side impacts and prevent forward movement of the occupant into the vehicle steering wheel, dashboard and the like.

Systems have been proposed which provide lateral restraint for the head of the occupant to protect in side-impact situations. In addition, proposals have been made which incorporate a pair of shoulder belts which may extend across the chest area of the user in an X-type pattern to improve the forward and lateral restraint capabilities of the overall system. Examples of prior vehicle seats including seat belt restraint systems and headrests may be found in U.S. Pat. No. 3,832,002 entitled AUTOMOTIVE RESTRAINT SYSTEM, which issued on Aug. 27, 1974, to Eggert, Jr. et al.; U.S. Pat. No. 4,440,443 entitled HEADREST, which issued on Apr. 3, 1984, to Nordskog; U.S. Pat. No. 4,679,854 entitled VEHICLE SEAT, which issued on Jul. 14, 1987, to Putsch et al.; U.S. Pat. No. 4,736,911 entitled AIRPLANE PASSENGER SEAT WITH FLAME-RETARDING CONSTRUCTION, which issued on Apr. 12, 1988, to Heitmann; and U.S. Pat. No. 5,123,673 entitled SEAT BELT SYSTEM FOR A VEHICLE SEAT, which issued on Jun. 23, 1992, to Tame.

Available systems do not readily adjust to the different physical characteristics of the users. Proper positioning of the head restraint to the particular user is not easily achieved. Many seats incorporate fixed headrest systems which provide no adjustment to adapt the system to the particular physical characteristics of the user. In addition, available seat belt restraint systems generally interfere with or contact the neck area of the user. Such systems may increase the risk of injury to the user in side-impact situations.

SUMMARY OF THE INVENTION

In accordance with the present invention, a vehicle seat assembly is provided which substantially overcomes the aforementioned problems. Essentially, the seat assembly includes a seat portion and a back portion. A headrest on the back provides rear and lateral restraint. The headrest is configured to cradle the neck of the user.

In further aspects of the invention, the back includes a vertically adjustable portion so that the headrest may be positioned properly for the individual user. The headrest includes a position indicator portion configured to engage the nape or back of the neck of the user and, hence, indicate that the headrest is properly positioned.

In still further aspects of the present invention, lateral restraint is provided by a mesh support which extends vertically from the headrest. A screen or mesh is connected between the mesh support and the headrest. The mesh is positioned to catch the head of the user in a lateral-impact situation to limit contact with the door columns, windows or other interior parts of the vehicle.

DETAILED DESCRIPTION OF THE PREFERRED EMBODIMENT

Figure 1:
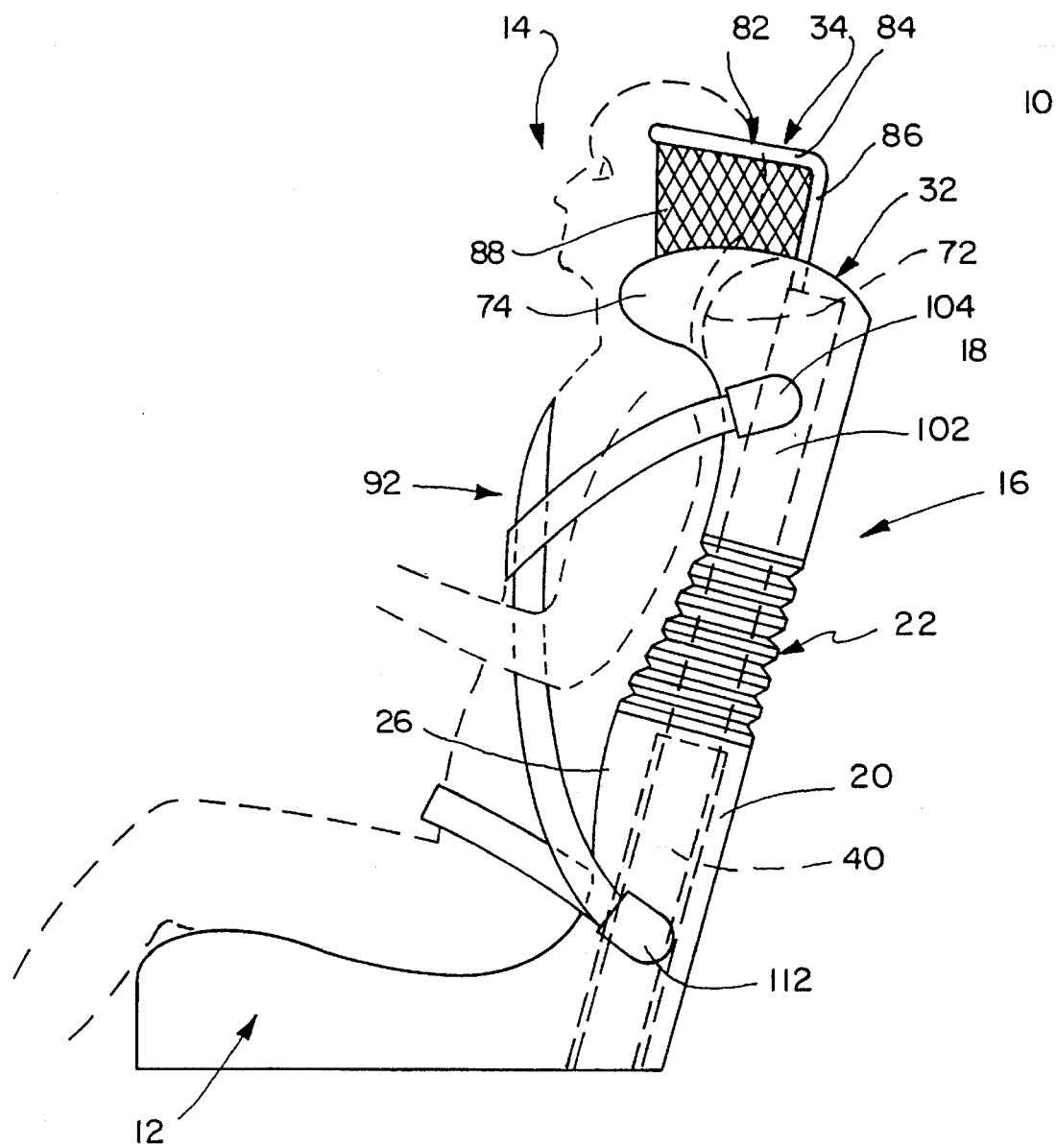
FIG. 1 is a side, elevational view of a vehicle seat assembly in accordance with the present invention.
Figure 3:
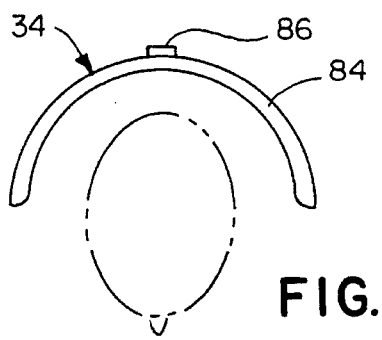
FIG. 3 is a view taken generally along line III—III of FIG. 2.
Figure 2:
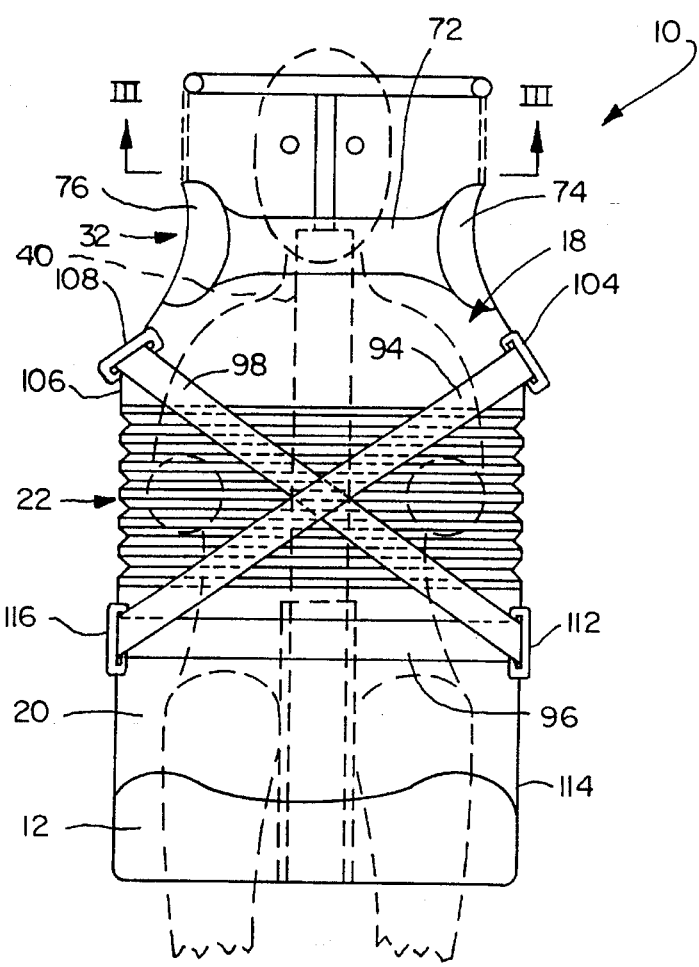
FIG. 2 is a front, elevational view of the seat assembly of FIG. 1.

A seat assembly in accordance with the present invention is illustrated in FIGS. 1 and 2 and generally designated by the numeral 10. Assembly 10 includes a seat portion 12 configured to support a user 14 and a back 16. Back 16 includes an upper or shoulder portion 18 and a lower or lumbar portion 20. Lower portion 20 is joined to seat portion 12. Portions 18 and 20 are interconnected by an accordion portion 22. Seat portion 12 and lower back portion 20 are defined by a steel frame, a suitable cushion and upholstery in a conventional fashion. Lower back portion 20 includes a lumbar area 26 configured to engage or be positioned against the lumbar region of the seated occupant or user. Upper back portion 18 includes a headrest system 32. Vertical positioning of upper portion 18 with respect to lower portion 20 properly positions the headrest for the user. In addition, seat 10 includes a lateral restraint system generally designated 34.

It is presently preferred that seat portion 12 and back 16 be mounted on a structural column 40. Structural column 40 permits vertical adjustment of upper portion 18 with respect to lower portion 20. In addition, column 40 mounts the seat assembly to the frame or pan of the vehicle. The frame of the back 16 and the frame of the seat portion 12 are welded or otherwise suitably secured to the column structure. In the alternative, a multiple column arrangement could be provided.

Figure 4:
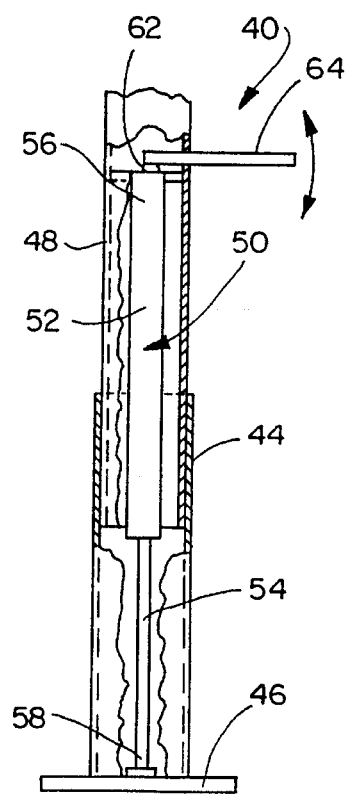
FIG. 4 is an enlarged, fragmentary, elevational view of a column assembly incorporated in the seat assembly of the present invention.

As shown in FIG. 4, one form of adjustable column assembly 40 includes a lower, tubular member 44. Tubular member 44 is secured to a base plate 46 which, in turn, may be bolted or welded to the vehicle frame. An upper or second tubular member 48 telescopes within base tubular member 44. An adjustment mechanism or positioner interconnects the tubular members. As shown, a pneumatic or hydraulic height adjuster 50 interconnects tubes 44, 48 to position tube 48 with respect to tube 44. A typical actuator 50 includes a cylinder 52 and a piston rod 54. Cylinder 52 is secured at an upper end 56 to tube 48. Piston rod 54 is secured at a lower end 58 to base plate 46. Actuator 50 may be a readily available commercial device which includes an actuator button 62. The actuator button, when pushed inwardly such as by an actuating lever 64, releases the cylinder 52 with respect to the piston rod 54, permitting telescoping adjustment of the cylinder with respect to the rod and, hence, of tube 48 with respect to tube 44. When actuating lever 64 is released, the actuator components are locked with respect to each other, hence locking the tubular members in position. It is presently envisioned that other actuating or adjusting mechanisms could be used. For example, a vertical height adjustment mechanism including a pivoting lever mounted on tubular member 48 which engages slots formed in tubular member 44 could be employed which would provide stepwise adjustment of tubular member 48 with respect to tubular member 44. The tubular members must overlap sufficiently to provide a rigid, strong column.

Upper back portion 18 is secured to member 48 of the column assembly 40. Vertical positioning of back portion 18 properly positions the headrest system 32 with respect to the user. The headrest system 32 includes a nape or position indicator section 72 and lateral or side restraint portions 74, 76. The headrest portions 72, 74 and 76 are padded and have a generally U-shape in plan. These portions define a collar-like structure. As seen in FIG. 1, portion 72 is gently curved outwardly away from the rear of back portion 18. The semicircular shape of portion 72 is configured to engage the nape or the back of the neck of the user. Lateral restraint portions 74, 76 extend smoothly outwardly and are configured to extend just over the inner shoulder area along the side of the neck of the user. The portions are configured to provide lateral restraint without extending outwardly or upwardly to points where they would interfere with the peripheral vision of the user. Head restraint portion 72 provides an indication that the back portion and, hence, the headrest is in the proper location for the particular user. Users of different height dimensions would sit in the chair and adjust back portion 18 until protuberance or position indicator 72 engages the rear of the neck. At this point, the lateral restraints 74, 76 are properly positioned with respect to the user and the user's shoulders. In addition, portion 72 provides rear restraint to prevent neck injury or whiplash in a rear-impact situation.

The lateral head restraint system 34 includes a support 82. Support 82 includes a generally semicircular or U-shaped tubular portion 84 joined to a vertical post 86. Support 82 may be a padded or coated steel tube. Support 82 is configured and dimensioned to extend along the back of the head of the user and forwardly along the sides of the head of the user above the user's ear area. A cloth or plastic mesh or screen 88 is secured to support 84 and to headrest 32. As seen in the drawings, the mesh will, therefore, be positioned to catch the head of the user in side-impact situations. The mesh will restrain movement and absorb shock. The mesh and lateral restraint system can reduce the occurrence of impact with interior parts of the vehicle such as door columns and windows. The headrest and head restraint systems will assist in protecting the vehicle user if the user is maintained in contact with the seat during impact.

In accordance with the present invention, a seat belt restraint system generally designated 92 is provided. Seat belt restraint system 92 includes a left or outboard shoulder belt 94, a lap belt 96 and a right or inboard shoulder belt 98. In the embodiment shown, shoulder belt 94 extends around the left shoulder and deltoid region of the user. Shoulder belt 98 extends around the right shoulder and deltoid region of the user. Belt 94 is secured to a side 102 of upper back portion 18 at an anchor point 104. Shoulder belt 98 is secured to the opposite side 106 of back portion 18 at an anchor point 108. Anchor points 104, 108 are positioned on the seat relative to the user to insure that the shoulder straps extend around the deltoid region of the shoulders. The belts are away from the neck area of the user. Better restraint of the occupant than presently available is obtained. The shoulder belts extend in a generally "X" pattern across the shoulders, lower chest and upper abdominal areas of the user. Shoulder belt 94 and lap belt 96 may be a conventional three-point lap and shoulder system. Lap belt 96 is anchored at an anchor point 112 to side 114 of lower back portion 20. The opposite end of the belt 96 is secured to an anchor point on the opposite side of back portion 20 by a suitable buckle 116. It is presently envisioned that shoulder belt 98 would be a separate belt which extends from a suitable retractor at its anchor point 108 and is secured at anchor point 112 by a suitable latch or buckle. The seat belts use conventional and readily available retractors and buckles.

The vehicle seat in accordance with the present invention, therefore, insures that the headrest is properly positioned with respect to the particular user. The headrest provides an indicator of the correct position. The user adjusts the upper back until the nape or indicator portion 72 is properly positioned against the back of the neck. The adjustable column, besides positioning the headrest, also positions the shoulder area of the upper back portion of the seat. Prior systems, which merely adjusted a headrest with respect to a fixed seat back, were not fully adaptable to the user. The adjustability of the present invention insures that lateral restraint portions 74, 76 are also positioned properly with respect to the neck and the shoulder of the user. Additional lateral restraint is provided by the mesh system 34. Finally, the X-pattern seat belt system restrains the user in the seat and eliminates hazards associated with contact of the neck of the user with the shoulder straps in side-impact situations.

In view of the above description, those of ordinary skill in the art may envision various modifications which would not depart from the inventive concepts disclosed herein. It is expressly intended, therefore, that the above should be considered as only a description of the preferred embodiment. The true spirit and scope of the present invention may be determined by reference to the appended claims.

The embodiments of the invention in which an exclusive property or privilege is claimed are defined as follows.

1. A vehicle seat assembly, said assembly comprising:

a seat portion;

a back connected to said seat portion, said back including an upper portion thereof for supporting an upper portion of the back of a seated user and a lower portion thereof for supporting a lower portion of the back of a seated user;

an adjustable column interconnecting said back upper portion and said back lower portion and adjusting said upper portion vertically with respect to said lower portion, said adjustable column having telescoping tubular members which are longitudinally extensible and retractable to vary the position of said back upper portion, and including a lock which retains said back upper portion in a desired position; and a headrest on said back upper portion having a generally U-shaped top plan configuration with arm portions for extending along the lateral sides of the neck of the user, and a position indicator portion for engaging the back of the neck of the user to indicate when said back upper portion is in the correct position.

2. An assembly as defined by claim 1 further comprising:

a mesh support extending vertically upward from the headrest, said mesh support having a generally U-shaped top plan configuration for extending around the back and sides of the head of the user; and a mesh extending between said mesh support and the headrest.

3. An assembly as defined by claim 1 further comprising a seat belt assembly on said seat and including outboard and inboard shoulder belts and a lap belt.

4. An assembly as defined by claim 3 wherein said shoulder belts are anchored to anchor points on sides of said upper back portion.

5. An assembly as defined by claim 4 wherein said anchor points are positioned adjacent medial portions of said upper back portion sides so that said shoulder straps are positioned away from the neck area of the user and extend over the deltoid areas of the shoulders of the user.

6. An assembly as defined by claim 5 further comprising:

a mesh support extending vertically upward from the headrest, said mesh support having a generally U-shaped top plan configuration for extending around the back and sides of the head of the user; and a mesh connected between said mesh support and the headrest.

7. An assembly as defined by claim 6 including a vertically flexible accordion portion positioned between and joining said back upper and lower portions.

8. An assembly as defined by claim 7 wherein said back lower portion includes an outwardly protruding lumbar support portion for engaging the lumbar region of the seated user.

9. A seat assembly for use in motor vehicles and the like, said seat assembly comprising:

a column adapted to secure the seat assembly to a vehicle frame;

a seat portion secured to said column;

a back portion secured to said column;

a headrest joined to said back portion, said headrest having a generally U-shaped top plan configuration and including lateral extensions for extending along the lateral sides of and cradling the neck of the user;

a mesh support extending vertically upward from the headrest, said mesh support having a generally U-shaped top plan configuration for extending around the back and sides of the head of the user; and a mesh extending between said mesh support and the headrest.

10. A seat assembly as defined by claim 9 wherein said headrest includes a nape portion for engaging the back of the neck of the user.

11. A seat assembly as defined by claim 10 wherein said column includes vertically adjustable telescoping sections for adjusting the vertical position of said back portion with respect to the seat portion in order to position the headrest nape portion properly for the individual user.

12. A seat assembly as defined by claim 11 further comprising a seat belt assembly on said seat and including inboard and outboard shoulder belts and a lap belt.

13. A seat assembly as defined by claim 12 wherein said shoulder belts are anchored to anchor points on sides of said back portion.

14. A seat assembly as defined by claim 13 wherein said anchor points are positioned adjacent medial portions of said upper back portion sides so that said shoulder straps are positioned away from the neck area of the user and extend over the deltoid areas of the shoulders of the user.

15. A seat assembly as defined by claim 9 wherein said column includes vertically adjustable telescoping sections for adjusting the vertical position of said back portion with respect to the seat portion in order to position the headrest properly for the individual user.

16. A seat assembly as defined by claim 15 further comprising:

inboard and outboard shoulder belts and a lap belt attached to said seat portion of said back portion.

17. A seat assembly as defined by claim 16 wherein said shoulder belts are attached to medial portions of the sides of the upper back portion and positioned away from the neck area of the user and to extend over the deltoid regions of the shoulders of the user.

* * * * *